United States Patent [19]

Bench et al.

[11] Patent Number: 4,882,071
[45] Date of Patent: Nov. 21, 1989

[54] METHOD AND APPARATUS FOR THE IN SITU DECONTAMINATION OF UNDERGROUND WATER WITH THE AID OF SOLAR ENERGY

[75] Inventors: Thomas R. Bench, Pittsburgh; Larry D. McCann, Elizabeth, both of Pa.

[73] Assignee: The United States of America as represented by The Department of Energy, Washington, D.C.

[21] Appl. No.: 146,638

[22] Filed: Jan. 21, 1988

[51] Int. Cl.⁴ .............................. F24J 3/02; B01D 1/22
[52] U.S. Cl. ..................... 210/747; 210/170; 159/903; 159/906; 159/DIG. 28; 202/234; 203/DIG. 1
[58] Field of Search ............... 210/747, 170; 159/902, 159/903, 906, DIG. 28; 202/234; 203/DIG. 1

[56] References Cited

U.S. PATENT DOCUMENTS

| | | | |
|---|---|---|---|
| 1,082,411 | 12/1913 | Cozzolino | |
| 2,427,262 | 9/1947 | Delano | 159/903 X |
| 3,257,291 | 6/1966 | Gerber | 202/234 |
| 3,702,762 | 11/1972 | Low | 159/1 X |
| 3,785,931 | 1/1974 | Coffey et al. | 159/903 X |
| 3,875,926 | 4/1975 | Frank | 159/906 X |
| 3,966,541 | 6/1976 | Sadon | 159/903 X |
| 4,172,767 | 10/1979 | Sear | 159/903 X |
| 4,326,923 | 4/1982 | Mortenson | 159/903 X |
| 4,329,205 | 5/1982 | Tsumura et al. | 159/906 X |
| 4,333,831 | 6/1982 | Petzinger | 210/170 |
| 4,462,713 | 7/1984 | Zurcher et al. | 210/747 X |
| 4,595,460 | 6/1986 | Hurt | 203/21 |

Primary Examiner—Tom Wyse
Attorney, Agent, or Firm—William W. Randolph; Judson R. Hightower; Richard E. Constant

[57] ABSTRACT

A method for the in situ decontamination of underground water containing non-volatile contaminants comprising continuously contacting in situ underground water containing non-volatile contaminants with a liquid-absorbent material possessing high capillary activity, allowing the non-volatile contaminants to deposit in the material while the water moves upwardly through the material by capillary action, allowing substantially decontaminated water to be volatilized by impinging solar radiation, and then allowing the volatilized water to escape from the material into the atmosphere.

An apparatus for the in situ decontamination of underground water containing non-volatile contaminants comprising at least one water-impermeable elongated conduit having an upper portion and first and second open ends and containing a homogeneous liquid-absorbent material possessing high capillary activity, means for supporting said conduit, and means for accelerating the escape of the volatilized decontamined water from the material, said means being detachably connected to the second end of the elongated conduit; wherein when underground water contaminated with non-volatile contaminants is continuously contacted in situ with the material contained in the first end of the conduit and the second end of the conduit is placed in contact with atmospheric air, non-volatile contaminants deposit in said material as the water moves upwardly through the material by capillary action, is then volatilized by impinging solar energy and escapes to the atmosphere.

19 Claims, 1 Drawing Sheet

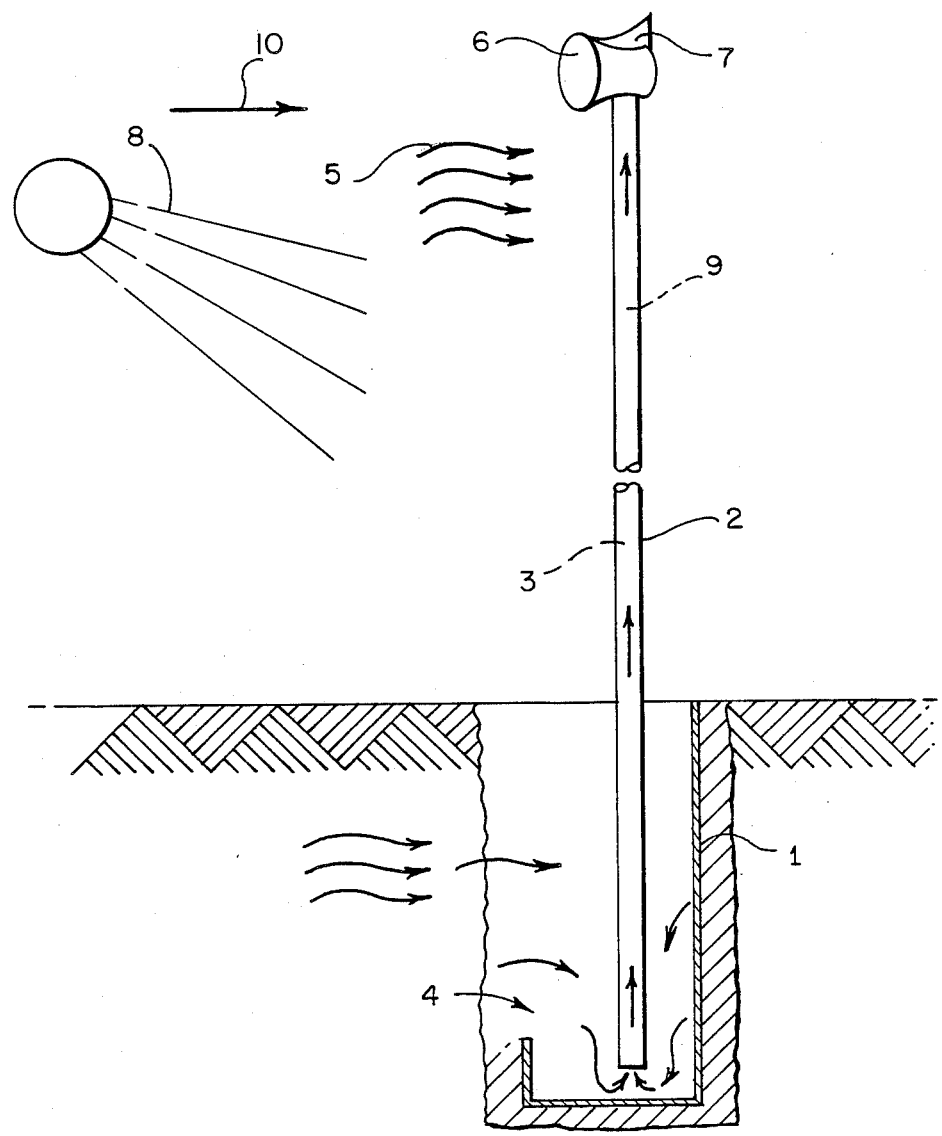

METHOD AND APPARATUS FOR THE IN SITU DECONTAMINATION OF UNDERGROUND WATER WITH THE AID OF SOLAR ENERGY

BACKGROUND OF THE INVENTION

1. Field Of The Invention

This invention relates to the field of purifying water. More particularly, the invention relates to a method and apparatus for removing non-volatile contaminants from contaminated water. The present invention is particularly well suited for obtaining purified water from radioactively contaminated areas.

2. Description of The Background

The purification of contaminated liquids, particularly water, has been attempted throughout history.

A large variety of equipment and methods have been reported for the purification of liquids such as water, particularly directed towards the purification of sewage, the desalination of water and the removal of salts from brines.

Most of the prior art processes have proven costly since they involve the utilization of cumbersome machinery and equipment, require transportation of the liquid to be purified to the processing plant, and the like.

The literature, however, is scanty when it comes to the in situ purification of liquids such as water by means of a simple and inexpensive system.

U.S. Pat. No. 4,326,923 to Mortenson describes an apparatus for distilling water from sea water. This apparatus consists of a column packed with layers of low capillary-activity materials such as sand and various metallic particles to attain an upwardly—increasing thermal conductivity, and a condenser maintained at a lower temperature than the column. Some layers may optionally contain cellulosic materials. The water is heated with solar energy, vaporized within the column, and then condensed and released to a tank.

A process for concentrating brine pumped from underground ore deposits is described in U.S. Pat. No. 3,966,541 to Sadan. This process concentrates brine by solar evaporation of a volume of water pumped from the ore deposits to attain a desired concentration of salts, and returning the concentrated brine to the underground ore reservoirs.

U.S. Pat. No. 4,333,831 to Petzinger relates to an apparatus for sewage treatment having a plurality of vertical evaporation tanks ending at the top in a rotary ventilator to prevent any water back-up or entry of rain.

U.S. Pat. No. 4,172,767 to Sear discloses a water purification system consisting of a closed evaporation tank heated by solar energy and a blower channeling vaporized water into a colder pipe and out of the tank area where condensation occurs.

U.S. Pat. No. 1,082,411 to Cozzolino relates to an apparatus for evaporating liquids such as beers and malt-like extracts, and semi-liquids such as crushed fruits and vegetables, jams and the like. The apparatus consists of a vessel to contain the liquid provided with an upper outlet to release vapor, a means for heating the liquid contained in the vessel and a series of fabric sheets which the evaporating liquid traverses in its upward movement towards the outlet.

U.S. Pat. No. 3,257,291 to Gerber relates to a desalination apparatus consisting of an elongated solar-heated evaporator positioned at an angle with respect to the horizontal to foster the downward flow of sea water, means for blowing air lengthwise inside the evaporator to carry vaporized water to a condenser which is cooled by the concentrated sea water, and means for withdrawing humidified air and condensing fresh water.

U.S. Pat. No. 3,702,762 to Low discloses an apparatus for vaporizing a metal to remove impurities therefrom. The apparatus consists of a U-shaped conduit having a center reservoir provided with heating coils to contain a liquid metal, an upwardly extending up-stream arm also provided with heating coils to vaporize the metal, a plurality of capillary tubes connected in a continuous fashion which are positioned inside the conduit between the reservoir and the up-stream arm of the conduit to conduct the vaporized metal from the up-stream arm through the reservoir and into an upwardly oriented down-stream arm of the conduit provided with cooling coils to liquify the metal and allow for vaporized impurities to be upwardly drawn by a vacuum line out of the down-stream arm.

U.S. Pat. No. 4,595,460 to Hurt describes an apparatus and method for distilling a liquid consisting of a reservoir having two liquid columns which communicate at the bottom and the top and have different levels of liquid. A higher level of liquid is attained in one of the columns by aeration. The liquid vaporized by solar energy from the column having the higher level of liquid leaves through the top of the reservoir and goes to a condenser where it is liquified.

Thus, there still exists a need for a simple method and apparatus for decontaminating water which can be easily applied to the site where the contaminated water is located, is simple to implement and requires substantially no energy input.

SUMMARY OF THE INVENTION

The present invention relates to a method for the in situ decontamination of underground water which contains non-volatile contaminants, said method comprising continuously contacting in situ underground water containing non-volatile contaminants with a liquid-absorbing material possessing high capillary activity;

allowing the non-volatile contaminants to deposit in the material while the water moves upwardly through the material by capillary action;

allowing substantially decontaminated water to be volatilized by impinging solar radiation; and allowing the volatilized water to escape from the material into the atmosphere.

This invention also relates to an apparatus for the in situ decontamination of underground water containing non-volatile contaminants, said apparatus comprising at least one water-impermeable elongated conduit having first and second open ends and containing a homogeneous water-absorbent material possessing high capillary activity;

means for supporting said conduit; and means for accelerating the escape of the volatilized decontaminated water from the material, said means being detachably connected to the second end of the elongated conduit; wherein when underground water contaminated with non-volatile contaminants is continuously contacted in situ with the absorbent material in the first end of the conduit and the second end of the conduit is placed in contrast with atmospheric air, non-volatile contaminants deposit in said material as said water moves upwardly through the material by capillary action, is then volatilized by impinging solar radiation and escapes to the atmosphere.

A more complete appreciation of the invention and many of the attendant advantages thereof will be readily perceived as the same becomes better understood by reference to the following detailed description when considered in connection with the accompanying figure.

DESCRIPTION OF THE DRAWINGS

The figure is a schematic representation of one embodiment of the apparatus of the invention. The figure represents an underground water source, the flow of which is received by an impermeable container 1 or subterranean dam having the shape of a J.

An elongated conduit 2 having the form of a long tube is filled with a homogeneous water-absorbent material 3 having high capillarity and inserted in the ground down to a level where it contacts the contaminated water 4.

The water starts to ascend through the material 3 by capillary action. As the water 4 ascends, the contaminants are retained by the material 3 along its pathway in the conduit or tube 2. The higher the water is in the conduit or tube 2, the purer and more devoid of contaminants it is.

A portion of the conduit or tube 2 is placed above ground where it is subjected to the action of solar radiation 8 which provides sufficient energy to vaporize the water 4. The water vapor 9 continues to ascend in the conduit or tube 2 and escapes from the upper portion of the tube substantially free of contaminants.

In the embodiment shown in the figure, the removal of the vapor is aided by air stream 5 travelling in direction 10 which is approximately perpendicular to the length of the conduit or tube 2.

Also shown in the figure are a venturi or converging nozzle 6 which increases the rate of flow of the air stream and a wind vane 7 to direct the nozzle in the direction of the wind.

Other objects, advantages and features of the present invention will become apparent to those skilled in the art from the following discussion.

DESCRIPTION OF THE PREFERRED EMBODIMENTS

The present invention arose from a perceived need to decontaminate useful liquids such as water prior to returning them to the environment for reuse by the population at large.

The present apparatus and process are applicable to the in situ decontamination of underground water containing non-volatile contaminants.

The entrapment of contaminants such as radioactive particles and the like by ground water which may be trapped or flowing through stratifications in the ground presents a problem, particularly when the contaminants are carried along with the water.

Ground water may come from many sources such as rain, snow and springs, and may draw contaminants into suspension (along its path), such as radioactive particles, as it passes through contaminated soil areas.

In the past, once ground water became contaminated it had to be pumped out of the ground to be processed to remove the contaminants.

The present invention provides an alternative to the prior art processes by returning decontaminated ground water to the environment without previously pumping it out of the ground.

A significant advantage of the present invention is that once the apparatus is installed and its operation initiated, it can work without any additional supply of energy (other than solar energy) as long as contaminated liquid in the reservoir is continuously in contact with the homogeneous water-absorbent material of high capillary activity at the lower end, and vaporized decontaminated water is allowed to escape from the other end.

Examples of water-absorbing materials having high capillary activity which are suitable for use in this invention are cellulose, cellulose derivatives and mixtures thereof. However, other absorbent materials capable of transporting up a liquid such as water and having high capillary activity may also be used within the context of this invention.

Materials having lower capillary activity such as metal articles, sand, and the like are less suitable for use with this invention.

When the water-absorbing material is packed in the conduit, it is essentially homogeneously distributed throughout the volume of the conduit. This is done substantially in the absence of other materials. This set up has particular and unexpected advantages in the context of the present invention.

The homogeneously distributed water absorbing material makes construction of this device much simplier and, thus, less expensive to manufacture than a device with several different materials employed in layers. Furthermore, employment of a highly capillary material throughout the height of the device results in efficient transport of liquid even in the absence of external energy. That the device works effectively in the absence of solar energy is demonstrated by the example described later, where the described test model was employed inside and away from the effects of the sun.

The two driving forces drawing the contaminated water out of a reservoir into the elongated conduit and releasing it into the atmosphere can best be described as follows.

(1) Diffusion through the absorbent medium by capillary action.

(2) Evaporation of the water in the upper part of the elongated conduit or tube facilitated by the incidence of solar energy.

The following is a mathematical treatment of the phenomenon involved in the present process. The equations describing such phenomenon are listed hereinbelow.

Equation (1) represents the upward absorption of water into the elongated conduit or tube $$J = \frac{D}{L} (C_0 - C_1) \qquad (1)$$

wherein

J is the mass flux in lb $_m$/ft$^2$ sec (lb of material/ft$^2$ sec) of the water travelling through the absorbent material into the atmosphere, D is the mass diffusion coefficient for water through the absorbent material in ft$^2$/sec, L is the length in ft of the tube, $C_0$ is the density of water in lb$_m$/ft$^3$ inside the reservoir of the container (or the trench) just at the bottom entrance of the elongated conduit, and $C_1$ is the density of water in $lb_m/ft^3$ in the absorbent material at the top of the elongated conduit.

Equation (II) represents the evaporation of water from the top of the tube.

$$J = h(C_1 - C_b) \quad (II)$$

wherein h is the coefficient of evaporation in ft/sec of the water into the atmosphere or air, and $C_b$ is the density of $lb_m/ft^3$ of water vapor in the atmosphere.

Since the water mass flux through the tube is equal to the water mass flux evaporating and escaping therefrom, J in equation (I) is equal to J in equation (II). By combining these equations, J or the mass flux evaporating can be derived as represented by equation (III) hereinbelow.

$$J = J_o / \left(1 + \frac{hL}{D}\right) \quad (III)$$

wherein $J_o$ is $h(C_o-C_b)$ or the water mass flux in $lb_m/ft^2$-sec if the water were evaporating directly into the atmosphere.

The value of $J_o$ for water at 70° F. with a 50% humidity content in the air, as obtained from *Mark's Standard Handbook for Mechanical Engineers*, is 0.017 $lb_m/ft^2$-hr. However, the mass flux is very sensitive to any variation in the temperature of the water. For water at 100 ° F. under the same air conditions (70° F. and 50% humidity content), the mass flux is 0.071 $lb_m/ft^2$-hr or more than four times as large.

As can be seen from equation (III), the water mass flux through the apparatus placed partially underground can be no greater than it would be if the water were in a reservoir placed above ground. This is to be expected since the value of $J_o$ in equation (III) is the upper limit of the mass flux.

The value for D is equation (III) must be determined experimentally and depends on the specific water-absorbent material utilized. This value also varies as the deposition of solid contaminants contained in the contaminated water in the absorbent material progresses.

The present invention provides an apparatus and a method for the in situ purification of contaminated underground water with the aid of solar energy to which the above analysis is applicable. The apparatus of the invention comprises at least one water-impermeable elongated conduit having an upper portion and first and second open ends and containing a homogeneous water-absorbent material of high capillary activity means for supporting said conduit, and means for accelerating the escape of the volatilized decontaminated water from the material, said means being detachably connected to the second end of the elongated conduit; wherein when underground water contaminated with non-volatile contaminants is continously contacted in situ with the material contained in the first end of the conduit and the second end of the conduit is placed in contact with atmospheric air, non-volatile contaminants deposit in said material as the water moves upwardly through the material by capillary action, is then volatilized by impinging solar radiation and escapes to the atmosphere.

The apparatus and process of the invention are tailored to permit the in situ purification of underground water.

The water-impermeable container is positioned at the level of an underground water table and receives a flow of water therefrom.

In this embodiment, a trench is cut into the soil having a desired size, and a depth and a width sufficient to reach an underground water table.

The trench is then lined with a water-impermeable barrier or container which is designed so that it can contain the flowing water.

In one form of this embodiment, the container takes the shape of a "J" and is made of a polymer film which does not deteriorate with time in order to form a subterranean dam.

One suitable polymer for the construction of the container is polyurethane. Other polymers and various materials may also be used.

A liquid-impermeable elongated conduit having two open ends is filled with a homogeneous water-absorbent material of high capillary activity and placed at an angle with the vertical and is by means of one of is open ends placed in contact with the water in the container. The angle may be 0°.

The conduit can be made of any water-impermeable material known in the art which preserves the rigidity of its shape. Suitable materials are polymers, metals, glass, and the like. However, other materials can also be employed. Particularly suitable materials for the portion of the conduit which is exposed to the solar rays are highly thermally conducting materials.

Each elongated container may have a cross-section which will facilitate the upward movement of the water by capillary action, and preferably takes the form of a circular tube having a suitable diameter.

The water-absorbent material forming a capillary column contained in the water-impermeable conduit may extend over a height of up to about one foot and more.

The water-absorbent material may be removed to permit the substitution of non-used for spent material after an amount of contaminants deposits which is effective to reduce the rate of passage of the water therethrough.

In practice, after a certain period during which the apparatus has been in operation, the elongated conduits or tubes are removed and replaced with other conduits or tubes filled with fresh absorbent material sine the capillaries of the spent material become blocked by residual salts and/or contaminants which are left behind as the clean water evaporates in its upward travel.

Where the water is contaminated with radioactive materials, the spent absorbing material is the processed as solid radioactive waste by known methods.

The absorbent material is introduced in the elongated conduit and one end of the conduit is then placed into the reservoir in the container in contact with the contaminated water while the other end is positioned in contact with the air.

As already indicated, the conduit may be positioned at an angle with the vertical which is between about 0° and 30°. A particularly preferred direction for the elongated conduit is the vertical direction.

In the embodiment where the elongated conduit is inserted in the trench and positioned inside of the water-impermeable dam, the conduit or tube is also preferably positioned vertically.

The trench containing the dam is backfilled with aggregates or filling materials in order to strengthen the walls of the container. Suitable aggregates are known in the art and need not be described herein.

At the time that operation is started, a small volume of water may be layered through the top of the elongated conduit to saturate homogeneous the water-absorbent material to thereby initiate its capillary action.

The contaminated water is drawn from inside the container or dam into the conduit by capillary action and thus starts to ascend through the homogeneous water-absorbent material.

When the water-impermeable container is placed underground, ground water flowing from a water table enters the area of the dam through a portion having a lower height than the remainder of the container (see the figure). The contaminated water accumulates in a reservoir delimited by the water-impermeable container and is then drawn into the conduit where it starts to ascend.

Once inside the conduit, the water travels upwardly while non-volatile contaminants such as particles which may or may not be radioactive are retained throughout its pathway by the water-absorbent material.

As the water enters the portion of the elongated conduit which is exposed to solar energy, the water is vaporized and water vapor eventually escapes through the upper portion of the conduit into the atmosphere.

The energy provided for the vaporization of the liquid is solar energy which is a free source of energy. However, if so desired, the solar energy may be supplemented with other sources of energy.

In a still more preferred embodiment of the invention, the conduit may be black, painted black or surrounded by a black thermally-conductive container to increase the amount of solar energy available to evaporate the liquid.

Suitably, the present method and apparatus are applicable to the decontamination of water flowing at an underground depth of about a foot and deeper.

In another preferred embodiment of the invention, a plurality of elongated conduits or tubes may be utilized to multiply the decontaminating capacity of the apparatus of the invention. Preferably, the plurality of elongated conduits are placed in a direction which is substantially parallel to one another. However, other arrangements are possible and are also within the confines of the invention.

Suitably, the upper (second) end of the conduit is positioned in the path of a stream of air which blows in a direction which is at an angle with the vertical.

The apparatus also comprises a means for accelerating the removal of the volatilized decontaminated water (water vapor) from the homogeneous water-absorbent material.

The means for accelerating the removal of the volatilized water may take the form of a venturi. One such venturi is the converging nozzle shown in the figure which has opposite large and small end openings for accelerating the circulation of the stream of air.

More particularly, the venturi is detachably connected to the elongated conduit at its upper end and has an opening to facilitate the contact between the water vapor and the stream of air so that the air may accelerate the removal of the decontaminated vapor.

The apparatus may further comprise a means for directing the large end opening of the venturi in the direction of the stream of air. A suitable means for directing the large end opening of the venturi into the stream of air is a vane, particularly a wind vane.

The invention also provides a method of in situ decontaminating underground water containing non-volatile contaminants comprising in situ and continuously contacting in situ water containing non-volatile contaminants with a lower portion of a water-absorbent material of high capillary activity, allowing the non-volatile contaminants to deposit in the absorbent material while the water moves upwardly through the material by capillary action, allowing substantially decontaminated water to be volatilized by impinging solar radiation, and then allowing the volatilized water to escape into the atmosphere.

The method of the invention may be conducted under conditions effective to attain the upward movement of the water by capillary action and the subsequent vaporization of the decontaminated water.

In addition, the method of the invention described hereinabove may further comprise increasing the energy received by the water by surrounding the absorbent material with a black tube and/or substituting unused absorbent material for spent absorbent material when an amount of contaminants deposits in said material which effectively reduces the rate of passage of the liquid therethrough.

Having now generally described this invention, the same will be better understood by reference to certain specific examples, which are included herein for purposes of illustration only and are not intended to be limiting of the invention or any embodiment thereof, unless so specified.

EXAMPLE

A small test model of the apparatus of the invention was built and the process of the invention reduced to practice. The model is 14 inches tall and 1⅛ inch in diameter.

For this test model, the flux of evaporated water is essentially the same as it would be if the tube had not been present. Accordingly, it was shown that the tube of the test model does not appear to impede mass flux when compared to an open pool.

Based on the above, it is estimated that up to about and including 100 4-inch diameter black tubes could be used to evaporate 16 $lb_m$ of water per day. This assumes the water is heated in black tubes with solar heating to 100° F.

The invention now being fully described, it will be apparent to one of ordinary skill in the art that many changes and modifications can be made thereto without departing from the spirit or scope of the invention as set forth herein.

What is claimed is:

1. A method for the in situ decontamination of underground water containing non-volatile contaminants with the aid of the solar energy, said method comprising
   continuously contacting in situ underground water containing non-volatile contaminants with a water-absorbent material possessing high capillary activity;
   allowing the non-volatile contaminants to deposit in the absorbent material while the water moves upwardly through the material by capillary action;
   allowing substantially decontaminated water to be volatilized by impinging solar radiation; and then allowing the volatilized water to escape from the material into the atmosphere.

2. The method of claim 1, wherein the water-absorbent material is homogeneous.

3. The method of claim 1, for decontaminating radioactivity-contaminated water.

4. The method of claim 1, further comprising providing non-solar energy to the liquid to increase its rate of volatilization.

5. The method of claim 1, further comprising increasing the amount of energy reaching the water by surrounding the absorbent material with a black tube.

6. The method of claim 1, wherein the high capillary activity material is selected from the group consisting of cellulose, derivatives thereof, and mixtures thereof.

7. The method of claim 1, further comprising substituting unused for used material after an amount of contaminants deposit in the material which is effective to reduce the rate of passage of the water therethrough.

8. The method of claim 1, further comprising forming a reservoir of water prior to placing the material in contact thereof.

9. The method of claim 1, further comprising accelerating the escape of the volatilized water into the atmosphere by removing the volatilized water.

10. The method of claim 1, further comprising saturating the material with water prior to contacting the contaminated water with the material.

11. An apparatus for the in situ decontamination of underground water containing non-volatile contaminants with the aid of solar energy, said apparatus comprising
at least one water-impermeable elongated conduit having an upper portion and first and second open ends and containing a homogeneous water-absorbent material possessing high capillary action, said material being in contact with the groundwater;
means for supporting said conduit; and
means for accelerating the escape of the volatilized decontaminated water from the material, said means including means for increasing the speed of the atmospheric air in the vicinity of the second end of the elongated conduit, wherein when underground water contaminated with non-volatile contaminants is continuously contacted in situ with the material contained in the first end of the conduit and the second end of the conduit is placed in contact with atmospheric air, non-volatile contaminants deposit in said material as the water moves upwardly through the material by capillary action, is then volatilized by impinging solar radiation and escapes to the atmosphere.

12. The apparatus of claim 11, further comprising
non-solar means for heating the upper portion of the conduit to increase the speed of volatilization of the water.

13. The apparatus of claim 11, wherein
the material contained in the elongated conduit is selected from the group consisting of cellulose, derivative thereof and mixtures thereof.

14. The apparatus of claim 11, wherein
the elongated conduit is removable.

15. The apparatus of claim 11, further comprising
a container positioned level with the underground water; and wherein
the contaminated water flows from the ground into the container.

16. The apparatus of claim 15, wherein
the container has the form of a J and is positioned at the water table so that the flow of water is stopped and redirected to the conduit containing the homogeneous capillary materials.

17. The apparatus of claim 11, wherein
the means for accelerating the escape of the volatilized water is a converging nozzle having opposite large and small end openings permitting the passage of atmospheric air, and a further opening permitting the escape of the volatilized decontaminated water from the conduit into the path of the air in the nozzle.

18. The apparatus for decontaminating water containing non-volatile contaminants according to claim 17, further comprising
means for directing the large end opening of the nozzle in the direction of the air.

19. The apparatus for decontaminating water containing non-volatile contaminants according to claim 18, wherein
the means for directing the large end opening of the nozzle in the direction of the air is a wind vane.

* * * * *